(12) United States Patent
Furui (10) Patent No.: US 7,359,780 B2
(45) Date of Patent: Apr. 15, 2008

(54) OCCUPANT PROTECTION ACTIVATION DEVICE

(75) Inventor: Takashi Furui, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/580,566

(22) PCT Filed: Jul. 1, 2005

(86) PCT No.: PCT/JP2005/012234

§ 371 (c)(1),
(2), (4) Date: Mar. 8, 2007

(87) PCT Pub. No.: WO2006/038355

PCT Pub. Date: Apr. 13, 2006

(65) Prior Publication Data

US 2007/0173998 A1    Jul. 26, 2007

(30) Foreign Application Priority Data

Oct. 5, 2004    (JP)    .............................. 2004-292883

(51) Int. Cl.
*B60R 22/00*    (2006.01)
(52) U.S. Cl. .......................... 701/45; 701/46; 180/268; 180/271; 280/734; 280/735; 340/438; 340/439

(58) Field of Classification Search ............ 701/45–47; 180/268, 271; 280/734, 735; 340/438, 439
See application file for complete search history.

(56) References Cited

U.S. PATENT DOCUMENTS

| | | | |
|---|---|---|---|
| 6,271,747 B1 * | 8/2001 | Fendt et al. | 340/436 |
| 6,782,316 B2 * | 8/2004 | Breed et al. | 701/49 |
| 6,784,379 B2 * | 8/2004 | Breed et al. | 177/144 |
| 6,958,451 B2 * | 10/2005 | Breed et al. | 177/1 |

FOREIGN PATENT DOCUMENTS

| | | |
|---|---|---|
| DE | 19740019 A1 | 3/1999 |
| EP | 1012004 B1 | 6/2000 |
| JP | 2000-326822 A | 11/2000 |
| JP | 2002-331905 A | 11/2002 |
| JP | 2003-237529 A | 8/2003 |

* cited by examiner

*Primary Examiner*—Gertrude A. Jeanglaude
(74) *Attorney, Agent, or Firm*—Birch, Stewart, Kolasch & Birch, LLP (57) ABSTRACT

A collision determination is made by using at least one of the output signals of a front G sensor disposed on a vehicle's fore-end and an analog G sensor disposed within the vehicle interior; a safety determination is made by using at least one of the output signals of the analog G sensor, the front G sensor, and a safing G sensor; and when both of the collision determining signal and the safing signal indicate the significance, an application specific IC and a transistor switch actuate a squib activating an air bag.

12 Claims, 3 Drawing Sheets

OCCUPANT PROTECTION ACTIVATION DEVICE

TECHNICAL FIELD

The present invention relates to an occupant protection activation device that activates a vehicle occupant protecting apparatus such as an air bag or a seat-belt pretensioner, which protects an occupant in crash conditions.

BACKGROUND ART

A conventional occupant protection activation device includes: two front sensors disposed at a vehicle's front-end; a safety or saving-determining circuit for detecting a signal from each of the front sensors to make a safety or saving determination; and a microcomputer for determining crashing of the vehicle, based on the output of the front sensors and a G sensor disposed at a location spaced from the front sensors. When the safety-determining circuit determines that the front sensor has detected a collision, the circuit inputs a signal indicating that the collision is detected to an AND circuit. At that time, the microcomputer that receives the detected signal of the G sensor outputs a signal, which determines an occurrence of the collision, to the AND circuit. The AND circuit, which received these signals, opens the gate thereof, and thereby a squib is supplied with a current to activate the air bag. On the other hand, when the front sensors does not detect any collision, but only the G sensor detects a collision, the gate of the AND circuit is not opened. Therefore, the squib is not supplied with current, and the air bag is not activated. The detection of the collision, made by the G sensor in such a case is judged to be a malfunction by the noise, and thereby the misoperation of the air bag is prevented. Thus, the microcomputer of the occupant protection activation device makes a safety determination such that the misoperation thereof is prevented, and determines whether the air bag is to be activated, based on the detection signals outputted from the plurality of sensors (for instance, see JP-A-2003-237529).

Patent reference 1: JP-A-2003-237529 (page 4, FIGS. 2 and 3)

The conventional occupant protection activation device has been arranged as mentioned above. As a result, it becomes difficult for the determining means such as the microcomputer determining on occurrence of collision, to make a proper collision determination in connection with the safety determination for preventing the malfunction, when the connection between the determining means and the sensors disposed at the vehicle's front-end is broken by the collision. For this reason, there is a problem that, when the vehicle crashed, the activation of the occupant protection apparatus becomes difficult.

The present invention has been accomplished to solve the above-mentioned problem. An object of the present invention is to provide an occupant protection activation device that activates the occupant protection apparatus even when the sensor disposed at the vehicle's front-end is disconnected therefrom by the collision, while making the safety determination for preventing the malfunction thereof.

DISCLOSURE OF THE INVENTION

An occupant protection activation device according to the present invention includes: a collision determining means that makes a collision determination by using at least one of the output signals of a first in-vehicle acceleration sensor and a front-end acceleration sensor; a first safety determining means that makes a safety determination by using the output signal of the first in-vehicle acceleration sensor; a second safety determining means that makes a safety determination by using at least one of the output signals of a second in-vehicle acceleration sensor and the front-end acceleration sensor; a signal processing means that has the collision determining means and the second safety determining means; and an actuating means that actuates the activating means of the occupant protection apparatus by the AND of the output signal of the first safety determining means and the output signal of the signal processing means.

According to the present invention, the occupant protection activation device includes: the collision determining means that makes a collision determination by using at least one of the output signals of the first in-vehicle acceleration sensor and the front-end acceleration sensor; the first safety determining means that makes a safety determination by using the output signal of the first in-vehicle acceleration sensor; the second safety determining means that makes a safety determination by using at least one of the output signals of the second in-vehicle acceleration sensor and the front-end acceleration sensor; and the actuating means that actuates the activating means of the occupant protection apparatus by the AND of the output signal of the signal processing means having the collision determining means and the second safety determining means, and the output signal of the first safety determining means. As a result, there is an effect that, even when the front-end acceleration sensors are disconnected therefrom at the time of vehicle clash, the occupant protection activation device can make a collision determination.

BEST MODE FOR CARRYING OUT THE INVENTION

An embodiment of the present invention will now be described by reference to the drawings in order to make description in further detail of the present invention.

Embodiment 1

Figure 1:
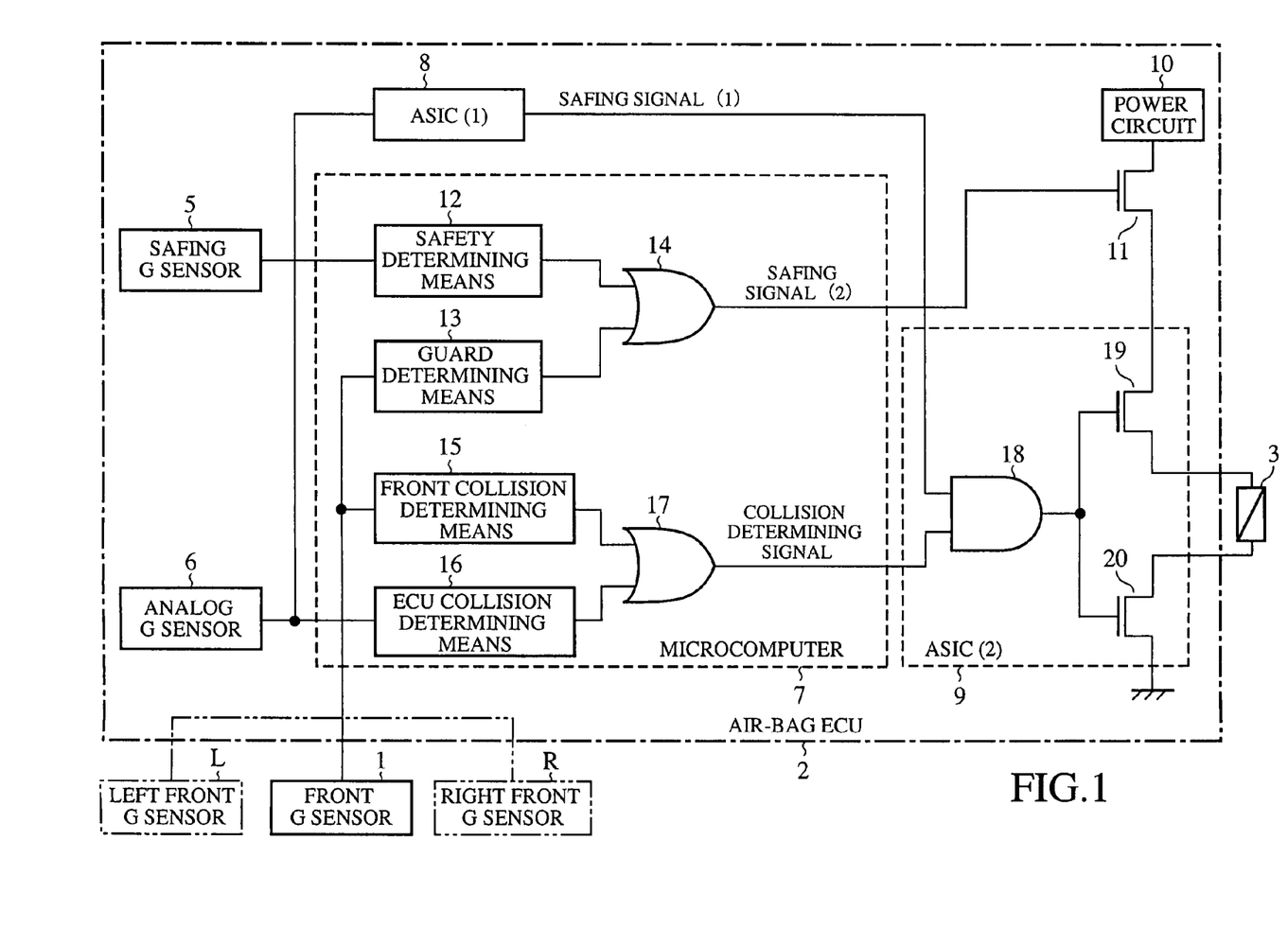
FIG. 1 is a block diagram showing the structure of an occupant protection activation device according to Embodiment 1 of the present invention.

FIG. 1 is a block diagram showing the structure of an occupant protection activation device according to Embodiment 1 of the present invention. The illustrated occupant protection activation device activates an air bag, for example, serving as a passenger safety device, and includes: a front G sensor (front-end acceleration sensor) 1, which is an electronic acceleration sensor provided at the center, for example, of the vehicle's front-end; an air-bag electronic control unit (hereinafter referred to as an ECU) 2, which controls the activation of the air bag omitted in the drawing; and a squib (activating means) 3 such as an igniter instantaneously expanding the air bag. Additionally, the occupant protection activation device may be arranged to activate a passenger safety device such as a seat-belt pretensioner tightening a seat belt, in addition to the aforementioned air bag.

The air-bag ECU 2 is provided within the vehicle interior, and in the casing of the unit, are provided a safing G sensor (second in-vehicle acceleration sensor) 5 consisting of a mechanical acceleration sensor, for example, and an analog G sensor (first in-vehicle acceleration sensor) 6 consisting of an electronic acceleration sensor. The occupant protection activation device includes: a microcomputer (a signal processing means, hereinafter referred to as simply a micro) that receives the output signals of these G sensors and performs the logical operation and the like; an application specific integrated circuit (hereinafter referred to as an ASIC) (1) 8 consisting of a safety determining circuit; an ASIC (2) 9 for actuating the squib 3 based on the output signals of the micro 7 and the ASIC (1) 8; a power circuit 10 for supplying an electric power actuating the squib 3; and a transistor switch 11 consisting of P-channel field-effect transistors, for example, and turning on and off the current supplied from the power circuit 10.

Thus, the air-bag ECU 2 includes: the determining means consisting of the microcomputer 7 and the ASIC (1) 8, which make a collision determination and a safety determination; and the actuating means consisting of the ASIC (2) 9 and the transistor switch 11, which controls the current supplied to the squib 3.

The microcomputer 7 includes: a safety determining means 12 for receiving the output signal of the safing G sensor 5; a guard determining means 13 for receiving the output signal of the front G sensor 1; and a OR operation means (hereinafter the OR operation means is referred to as the OR means) 14, which outputs the OR of the output signal of the safety determining means 12 and the output signal of the guard determining means 13. The output signal of the OR means 14 is inputted to the gate of the transistor switch 11. The source of this transistor switch 11 is connected with the power circuit 10, and the drain thereof is connected with the ASIC (2) 9. Moreover, the microcomputer 7 includes: a front collision determining means 15 for receiving the output signal from the front G sensor 1; an ECU collision determining means 16 for receiving the output signal of the analog G sensor 6; and an OR means 17 for outputting the OR of the output signal of the front collision determining means 15 and the output signal of the ECU collision determining means 16. The output signal of the OR means 17 is inputted to the AND operation means (hereinafter the AND operation means is referred to as the AND means) 18 of the ASIC (2) 9.

Thus, the microcomputer 7 includes the means, which performs the safety determination, consisting of the safety determining means 12, the guard determining means 13, and the OR means 14; and further, the microcomputer includes the means, which performs the collision determination, consisting of the front collision determining means 15, the ECU collision determining means 16, and the OR means 17.

The ASIC (2) 9 is a circuit into which circuits actuating the squib 3, that is, squib drivers are integrated, and the ASIC includes: the AND means 18 for outputting the AND of the output signal of the ASIC (1) 8 and the output signal of the OR means 17; a high-side transistor switch 19; and a low-side transistor switch 20, with both of these transistor switches inputting the output signal of the AND means 18 to the gate. The high-side transistor switch 19 and the low-side transistor switch 20 consist of n-channel field-effect transistors, for example, and the gate of each of the transistors receives the output signal of the AND means 18, indicating the AND, as stated above. With the high-side transistor switch 19, the drain thereof, for example, is connected with the drain of the transistor switch 11; and the source of the high-side transistor switch 19 is connected with one terminal of the squib 3. With the low-side transistor switch 20, the drain thereof, for example, is connected with the other terminal of the squib 3, and the source thereof is grounded. The transistor switch 11 is connected with the high-side transistor switch 19 in series, as described above, and the switch turns on and off the connection between the power circuit 10 and the ASIC (2) 9.

The operation will now be described as below

The occupant protection activation device according to Embodiment 1, determines a vehicle crash condition from the acceleration detected by the front G sensor 1 and the analogue G sensor 6, and makes a safety determination to prevent the air bag from malfunctioning, from the acceleration detected by the front G sensor 1, the safing G sensor 5, and the analog G sensor 6. Herein, the acceleration detected by each of the sensors is the collision acceleration generated on the vehicle at the time of collision. Hereinafter, the acceleration represents the collision acceleration. The front G sensor 1 is disposed on the vehicle's front-end so that the sensor can quickly detect the crash requiring the activation of the air bag. The analog G sensor 6 and the safing G sensor 5 are disposed in the vicinity of the center in a direction of from front to rear of the vehicle, because the wiring of the front G sensor 1 might be disconnected together with the vehicle body broken at the time of crash, and these sensors are provided, for example, within the unit of the air-bag ECU 2 provided in the vehicle interior.

For the front G sensor 1 and the analogue G sensor 6, electronic acceleration sensors are used as stated above. The electronic acceleration sensor outputs a signal corresponding to the magnitude of the detected acceleration. These front G sensors 1 and analog G sensors 6 can detect not only the acceleration having a definite magnitude such as the maximum acceleration at the time of vehicle crash but also the acceleration having a magnitude within a certain range, generated on the vehicle.

The collision determination is made by the front collision determining means 15 and the ECU collision determining means 16 provided in the microcomputer 7, and further, whether the collision occurred is determined by the OR of the results of the determination made by the front collision determining means 15 and the ECU collision determining means 16.

The output signal of the front G sensor 1 is inputted to the guard determining means 13 and the front collision determining means 15. The guard determining means 13 and the front collision determining means 15 each use thresholds, which are different from each other, and determine the output signal of the front G sensor 1. The front collision determining means 15 uses the threshold, which is larger than that used by the guard determining means 13, to determine the output signal of the front G sensor 1, and determines whether this output signal indicates the acceleration generated by the collision for which the air bag is to be developed.

The output signal of the analog G sensor 6 is inputted to the ASIC (1) 8 consisting of the safety determining circuit and to the ECU collision determining means 16. The ASIC (1) 8 and the ECU collision determining means 16 each use thresholds, which are different from each other, to determine the output signal of the analog G sensor 6. The ECU collision determining means 16 uses the threshold, which is larger than that used by the ASIC (1) 8, to determine the output signal of the analog G sensor 6, and determines whether this output signal indicates the acceleration generated by the collision for which the air bag is to be developed.

The OR means 17 receives the output signals of the front collision determining means 15 and of the ECU collision determining means 16, and outputs the collision determining signal indicating the OR of these output signals. When, in this manner, either or both of the results of the determination made by the front collision determining means 15 and the ECU collision determining means 16 show that the collision occurred, the collision determining signal indicating the significance is outputted by the OR means 17, that is, the microcomputer 7.

Thus, in the operation of the collision determination by the microcomputer 7, when even either the front G sensor 1 or the analog G sensor 6 detected the acceleration generated by the collision, the microcomputer operates such that the collision determining signal indicating the significance is outputted, thereby fail-safing the disconnection of the front G sensor 1 chiefly.

The safety determination, which prevents the malfunction of the air bag, that is, the malfunction of the squib 3, is made by the safety determining means 12 and the guard determining means 13 provided in the microcomputer 7, and further, the OR of the results of the determination made by the safety determining means 12 and the guard determining means 13 is calculated to make the safety determination. Moreover, the safety determination is made by the ASIC (1) 8 separately from the determining operation of the microcomputer 7. In other words, in a plurality of IC chips, the safety determinations are separately made.

The output signal of the analog G sensor 6 is inputted to the ECU collision determining means 16 as previously mentioned, and further, the signal is inputted to the ASIC (1) 8. The ASIC (1) 8 is an integrated circuit constituting the safety determining circuit as mentioned above. The ASIC outputs the safing signal (1) representing the significance, when detecting the acceleration that is smaller than the shock generated at the time of vehicle crash, that is, smaller than the acceleration generated at the time, from the output signal of the analog G sensor 6. As the threshold used when it is determined whether the safing signal (1) is significant, the threshold is used, which is smaller than that used to make the collision determination in the ECU collision determining means 16. Thus, a small threshold is used for the safety determination, thereby positively detecting that the vehicle crashed.

The ASIC (1) 8 is an element separate from the microcomputer 7. For this reason, even in the event where any failure occurs in the microcomputer 7 to exert an influence on the determination operation by the safety determining means 12 and the guard determining means 13, the safing signal (1) outputted by the ASIC (1) 8 is not affected. Therefore, even when a failure occurred in the microcomputer 7 causes the microcomputer to output the collision determining signal and the safing signal (2) as if the collision was detected though the vehicle did not actually crash, the safing signal (1) indicates no significance, thereby preventing the misoperation of the squib 3, that is, the mal-explosion of the air bag.

The output signal of the front G sensor 1 is inputted to the front collision determining means 15 as stated above, and further, the signal is inputted to the guard determining means 13. The guard determining means 13 uses, as described above, the threshold, which is smaller than that used by the front collision determining means 15, to make the safety determination from the magnitude of the acceleration detected by the front G sensor 1.

The safing G sensor 5, together with the analog G sensor 6, provided within the unit of the air-bag ECU 2, consists of the mechanical acceleration sensor, for example, as mentioned above, and outputs the signal indicating the significance when detecting the acceleration, which exceeds the predetermined magnitude. When detecting the acceleration, which is smaller than that detected by the analog G sensor 6, for example, at the time of collision, the sating G sensor outputs the signal indicating the significance to the safety determining means 12.

The safety determining means 12 determines whether the safing G sensor 5 detected such a small acceleration as stated above, and when determining that the safing G sensor detects the acceleration, the means outputs the signal indicating the significance to the OR means 14.

When the guard determining means 13 and the safety determining means 12 each detected an acceleration, which is smaller than that generated at the time of vehicle crash, from the sensors, the two means each output a signal indicating the significance. The threshold, which the guard determining means 13 uses when determining whether the guard determining means outputs a signal of significance, is smaller than the threshold, which the front collision determining means 15 uses for making a collision determination. The threshold, which the safety determining means 12 uses when determining whether the safety determining means outputs a signal of significance, is smaller than the threshold, which the ECU collision determining means 16 uses for making a collision determination. Thus, the threshold used for making the safety determination is set smaller than the threshold used for making the collision determination, thereby surely detecting the vehicle crash.

The output signal of the safety determining means 12 and the output signal of the guard determining means 13 are inputted to the OR means 14 to obtain the OR of these output signals. When at least one of the output signals of the safety determining means 12 and of the guard determining means 13 thus indicates that the small acceleration is detected as stated above, the OR means 14 outputs a safing signal (2) indicating the significance.

In this manner, when in the operation of the safety determination by the microcomputer 7, even either the front G sensor 1 or the safing G sensor 5 detects the acceleration as mentioned above, the microcomputer operates such that the safing signal (2) indicating the significance is outputted, thereby chiefly fail-safing the disconnection of the front G sensor 1. Also in the safety determination, the fail-safe in controlling the front G sensor 1 is achieved similarly as in the collision determination. For this reason, even when the vehicle's fore-end is provided with only one front G sensor 1, the operation of detecting the vehicle crash and actuating the air bag and the operation of preventing the malfunction of the air bag can be positively performed.

The ASIC (2) 9 receives the safing signal (1) and the collision determining signal. In more detail, the AND means 18 of the ASIC (2) 9 receives the safing signal (1) from the ASIC (1) 8 and the collision determining signal from the OR means 17 of the microcomputer 7. The AND means 18 obtains the AND of the safing signal (1) and the collision determining signal, inputs the output signal indicating this AND to the gates of the high-side transistor switch 19 and the low-side transistor switch 20, and controls the ON/OFF operation of the high-side transistor switch 19 and the low-side transistor switch 20. The high-side transistor switch 19 and the low-side transistor switch 20 are simultaneously controlled to the ON state or OFF state, and these switches simultaneously turn on or off the connection between the power circuit 10 and the squib 3 and the connection between the squib 3 and ground. The high-side transistor switch 19 and the low-side transistor switch 20 enter the ON state when both of the safing signal (1) and the collision determining signal indicate the significance. The safing signal (2) is inputted to the gate of the transistor switch (semiconductor switch) 11 connected with the power circuit 10 as stated above, and the ON/OFF operation of the transistor switch 11 is controlled in accordance with the result of the safety determination carried out by the microcomputer 7.

When the safing signal (2) indicates the significance, the transistor switch 11 is controlled to the ON state, and the power current flows from the power circuit 10 to the ASIC (2) 9 to be supplied to the high-side transistor switch 19. At that time, when the high-side transistor switch 19 and the low-side transistor switch 20 have been controlled to the ON state by the output signal of the AND means 18 as previously stated, the drive current is outputted from the ASIC (2) 9. When the drive current flowed to the squib 3, the ignition operation detonating and expanding the air bag is performed.

In the above-described explanation, the mechanical acceleration sensor is used as the safing G sensor 5; however, when an electronic acceleration sensor is used, a similar effect is also obtained in the operation. In the case in which an electronic acceleration sensor is used as the safing G sensor 5, the safety determining means 12 determines whether the output signal of the safing G sensor 5 indicates the acceleration such as described above, which is smaller than the acceleration generated at the time of collision. When the safety determining means determined that the output signal indicates the acceleration that is smaller than that generated at the time of collision, the determining means outputs the signal indicating that the acceleration is detected. In detail, the safety determining means makes the determination by using the threshold detecting the acceleration, which is smaller than that detected by the front collision determination means 15 and the ECU collision determination means 16, and when the safety determining means determined that the output signal of the safing G sensor 5 is larger than this threshold, the determining means outputs the signal indicating the significance to the OR means 14.

The structure of the activating device having only one front G sensor 1 is illustrated in FIG. 1; however, the device may be provided with, for example, two front G sensors, R and L, shown in dotted line in FIG. 1 in place of this front G sensor, and these front G sensors may be disposed on either side of the vehicle's fore-end. In the case in which the device has front G sensors R and L in this manner, when the front collision determining means 15, for example, detected a large acceleration generated at the time of collision from at least one of the output signals of the right and left front G sensors 1, the determining means outputs a signal indicating the significance to the OR means 17; and when the guard determining means 13 detected an acceleration such as previously described, which is smaller than the acceleration generated at the time of collision, from at least one of the output signals of the right and left front G sensors 1, the guard determining means outputs a signal indicating the significance to the OR means 14. In the case in which the device is thus arranged, in the collision determination by the microcomputer 7, when the acceleration generated by the collision is detected from at least one of the output signals of the front G sensors R, L, and the analog G sensor 6, the collision determining signal indicating the significance is outputted; and in the safety determination, when the small acceleration such as previously described is detected from at least one of the output signals of the front G sensors R, L, and the safing G sensor 5, the safing signal (2) indicating the significance is outputted.

As mentioned above, according to Embodiment 1, it is arranged that the microcomputer 7 output the collision determining signal indicating the significance when detecting the acceleration generated by the collision from at least one of the output signals of the front G sensor 1 and the analog G sensor 6; the microcomputer output the safing signal (2) indicating the significance when detecting the acceleration, which is smaller than that generated by the collision, from at least one of the output signals of the front G sensor 1 and the safing G sensor 5; the ASIC (1) 8 output the safing signal (1) indicating the significance when detecting the acceleration, which is smaller than that generated by the collision, from the output signal of the analog G sensor 6; and the ASIC (2) 9 control the high-side transistor switch 19 and the low-side transistor switch 20 to the ON state when both of the sating signal (1) and the collision determining signal indicates the significance. As a result, there is achieved an effect that even when the front G sensor 1 is disconnected at the time of collision, the air bag can be positively activated.

Moreover, there is obtained an effect that the air bag can be surely prevented from malfunctioning when a failure occurred in any one of the front G sensor 1, the sating G sensor 5, the analog G sensor 6, and the microcomputer 7.

Further, it is arranged that a mechanical acceleration sensor be used as the sating G sensor 5. Thereby, there is achieved an effect that the cost thereof can be reduced and the high-speed responsivity of the front G sensor 1 can be prevented from being reduced by the OR means 14 calculating the OR of the output signals of the guard determining means 13 with the front G sensor 1 and of the safety determining means 12.

Furthermore, it is arranged that the current of the power circuit 10 be supplied to the ASIC (2) 9, into which the high-side transistor switch 19, the low-side transistor switch 20, and the AND means 18 are integrated, through the transistor switch 11. For this reason, there is obtained an effect that even if a failure occurred in the ASIC (2) 9 or the equivalent, the squib 3 is not supplied with the current, thereby enabling the prevention of the malfunction of the air bag.

Embodiment 2

Figure 2:
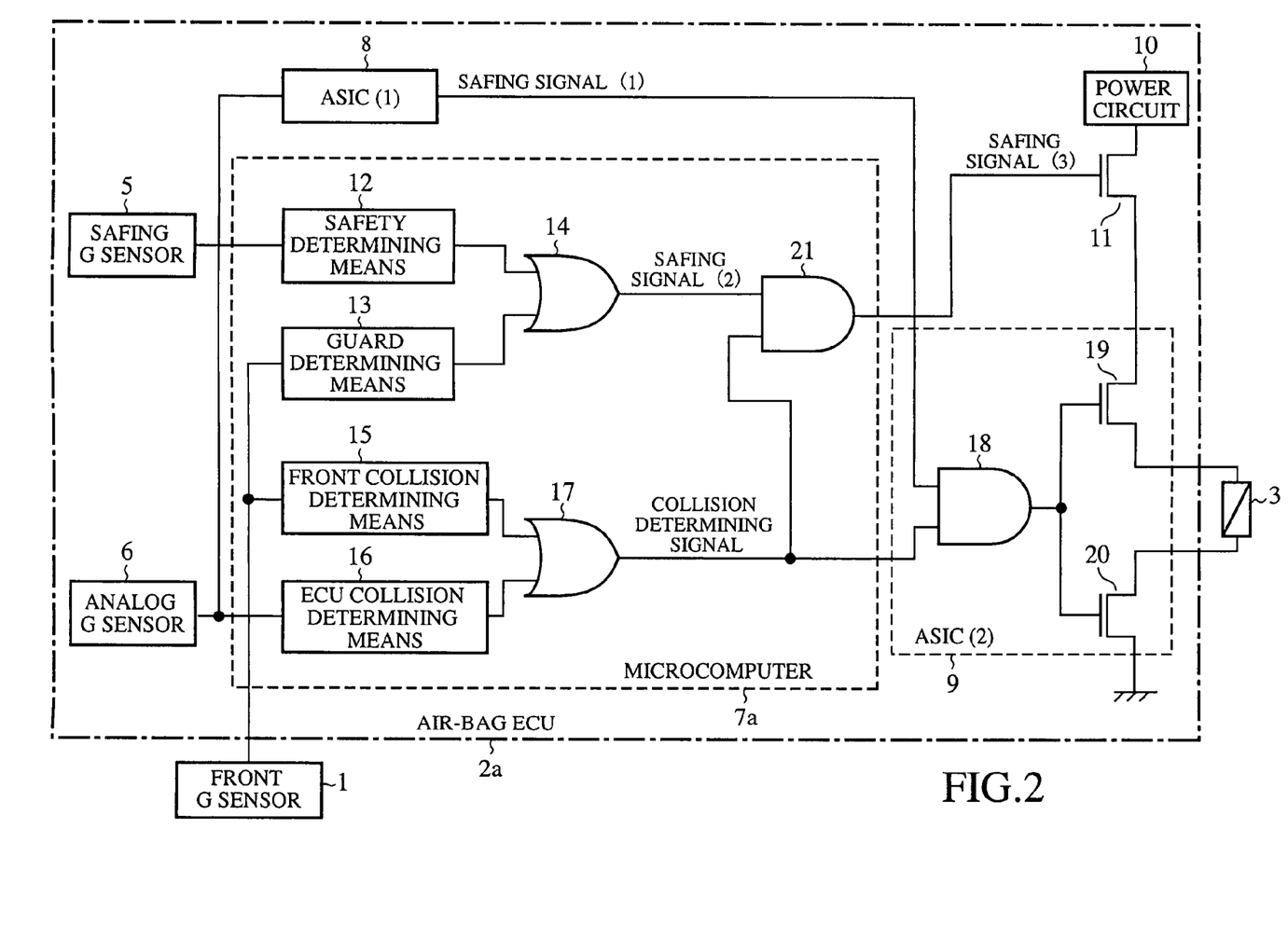
FIG. 2 is a block diagram showing the structure of an occupant protection activation device according to Embodiment 2 of the present invention.

FIG. 2 is a block diagram showing the structure of an occupant protection activation device according to Embodiment 2 of the present invention. The same parts as that shown in FIG. 1 or the parts corresponding thereto are designated by similar numerals, and the explanation thereof is omitted. The microcomputer 7a shown in FIG. 2, is arranged similarly to the microcomputer 7 shown in FIG. 1 except that the microcomputer 7a is provided with an AND means 21 receiving the safing signal (2) outputted from the OR means 14 and the collision determining signal outputted from the OR means 17. Further, the air-bag ECU 2a shown in FIG. 2 is arranged similarly to the air-bag ECU 2 shown in FIG. 1 except that the sating signal (3) outputted from the microcomputer 7a, more specifically, outputted from the AND means 21 is arranged to be inputted to the gate of the transistor switch 11. The explanation of the parts similar to that described in Embodiment 1 is omitted.

The operation will now be described as below.

Here, the detailed explanation of the operation of the parts operating similarly to that of the occupant protection activation device according to Embodiment 1 is omitted, and the operation of the characteristic parts of the occupant protection activation device according to Embodiment 2 will be described as below.

As described in Embodiment 1, when a signal indicating the significance is outputted from the front collision determining means 15 receiving the output signal of the front G sensor 1 or from the ECU collision determining means 16 receiving the output signal of the analog G sensor 6, in more detail, when a signal indicating the significance is outputted from at least one of the front collision determining means 15 and the ECU collision determining means 16, the OR means 17 outputs the collision determining signal indicating the significance. The operation of the ASIC (1) 8 that receives the output signal of the analog G sensor 6 to make the safety determination is similar to that described in Embodiment 1.

When a signal indicating the significance is outputted from the safety determining means 12 receiving the output signal of the safing G sensor 5 or from the guard determining means 13 receiving the output signal of the front G sensor 1, in more detail, when a signal indicating the significance is outputted from at least one of the safety determining means 12 and the guard determining means 13, the OR means 14 outputs the safing signal (2) indicating the significance.

The AND means 21 outputs a safing signal (3) indicating the significance when receiving a safing signal (2) indicating the significance and a collision determining signal indicating the significance. The microcomputer 7a outputs a collision determining signal and a safing signal (3).

The transistor switch 11 receives the safing signal (3) outputted from the AND means 21 from the gate thereof, and enters the ON state when the safing signal (3) indicates the significance to supply the power current outputted from the power circuit 10 to the ASIC (2) 9. The ASIC (2) 9 operates similarly to that described in Embodiment 1. That is, the ASIC (2) 9 receives the collision determining signal outputted from the microcomputer 7a and the safing signal (1) outputted from the ASIC (1) 8, and when both of these signals indicate the significance, the high-side transistor switch 19 and the low-side transistor switch 20 enter the ON state, thereby outputting the drive current to the squib 3.

As mentioned above, according to Embodiment 2, it is arranged that the microcomputer 7a be provided with the AND means 21 receiving the safing signal (2) outputted from the OR means 14 and the collision determining signal outputted from the OR means 17 and calculating the AND thereof, and the operation of the transistor switch 11 be controlled by the safing signal (3) outputted from the AND means 21. As a result, there is obtained an effect that the air bag can be positively prevented from malfunctioning when a failure occurred in any one of the front G sensor 1, the safing G sensor 5, the analog G sensor 6, and the microcomputer 7a.

Embodiment 3

Figure 3:
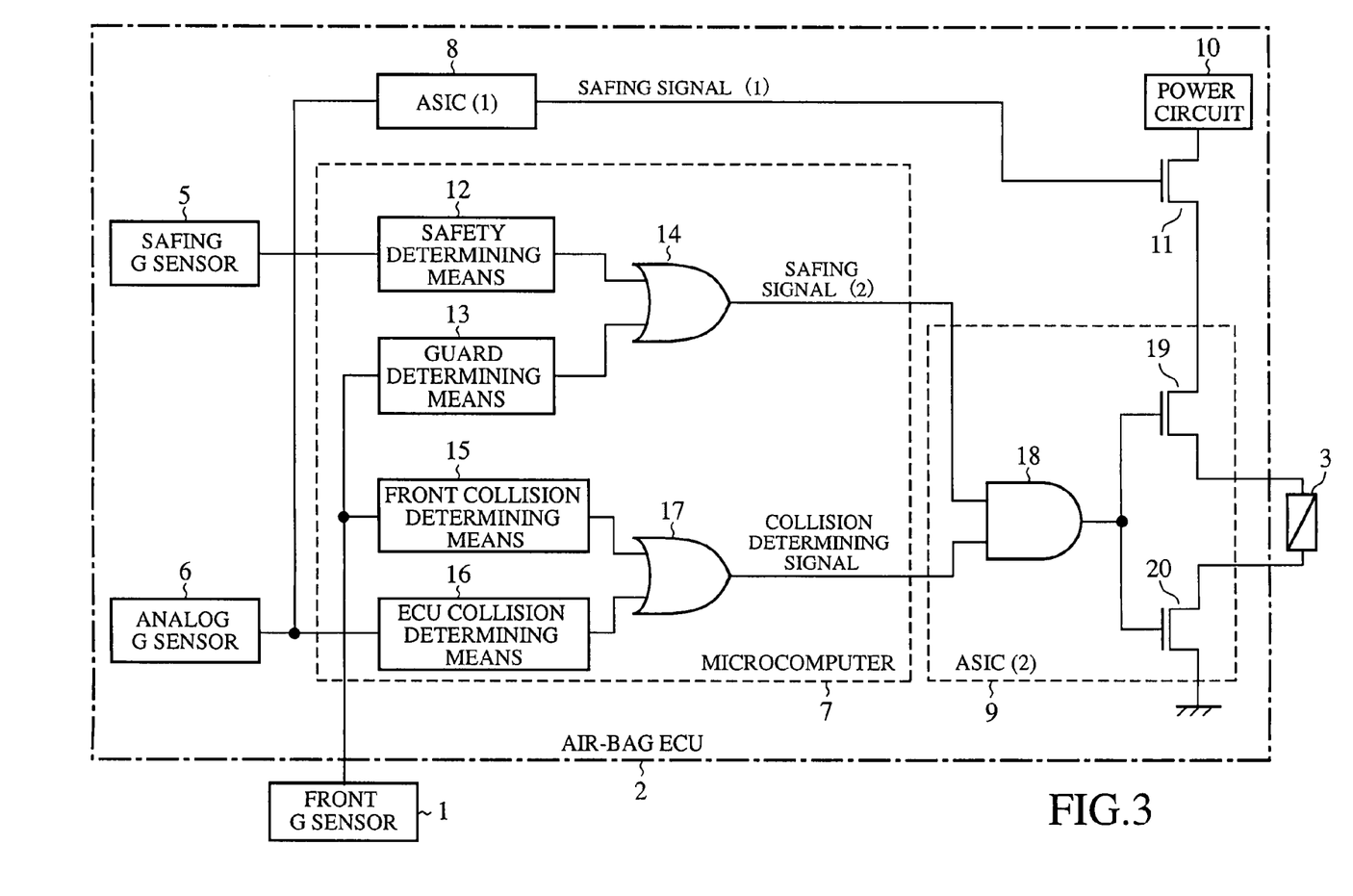
FIG. 3 is a block diagram showing the structure of an occupant protection activation device according to Embodiment 3 of the present invention.

FIG. 3 is a block diagram showing the structure of an occupant protection activation device according to Embodiment 3 of the present invention. The same parts as that shown in FIG. 1 or the parts corresponding thereto are designated by similar numerals, and the explanation thereof is omitted. The air-bag ECU 2b shown in FIG. 3 is arranged similarly to the air-bag ECU 2 shown in FIG. 1 except that the safing signal (1) outputted from the ASIC (1) 8 is inputted to the gate of the transistor switch 11, and the safing-signal (2) outputted from the OR means 14 is inputted to the AND means 18 together with the collision determining signal outputted from the OR means 17. The explanation of the parts arranged similarly to that described in Embodiment 1 is omitted.

The operation will now be described as below.

Here, the explanation of the operation of the parts arranged similarly to that of the occupant protection activation device according to Embodiment 1 is omitted, and the operation of the characteristic parts of the occupant protection activation device according to Embodiment 3 will be described as below.

The ON/OFF operation of the transistor switch 11 of the air-bag ECU 2b shown in FIG. 3 is controlled by the safing signal (1) outputted from the ASIC (1) 8. That is, when the safing signal (1) indicates the significance, the power current is supplied from the power circuit 10 to the ASIC (2) 9. Further, the AND means 18 of the ASIC (2) 9 controls the high-side transistor switch 19 and the low-side transistor switch 20 to the ON state when both of the safing signal (2) outputted from the OR means 14 of the microcomputer 7 and the collision determining signal outputted from the OR means 17 indicate the significance. The operation other than that described here is similar to the operation of the air-bag ECU 2 shown in FIG. 1, described in Embodiment 1.

As mentioned above, according to Embodiment 3, it is arranged that the microcomputer 7 output the collision determining signal and the safing signal (2) to the ASIC (2) 9, and the ASIC (1) 8 output the safing signal (1) to the gate of the transistor switch 11. As a result, there is achieved an effect that the air bag can be positively activated even when the front G sensor 1 is disconnected at the time of collision.

Furthermore, there is obtained an effect that the air bag can be surely prevented from malfunctioning when a failure occurred in any one of the front G sensor 1, the safing G sensor 5, the analog G sensor 6, and the microcomputer 7.

INDUSTRIAL APPLICABILITY

As described above, the occupant protection activation device according to the present invention is suitable for activating an occupant-protecting apparatus such as an air bag or a seat-belt pretensioner protecting the vehicle-occupant at the time of vehicle crash.

The invention claimed is:

1. An occupant protection activation device comprising:
    a first in-vehicle acceleration sensor, disposed within a vehicle interior, for electronically detecting acceleration and outputting a first output signal;
    a second in-vehicle acceleration sensor, disposed within said vehicle interior, for electrically detecting acceleration and outputting a second output signal;
    a front-end acceleration sensor, disposed at the center of the vehicle's front-end, for electronically detecting acceleration and outputting a third output signal;
    a collision determining means for making a collision determination by using at least one of the output signals of the first in-vehicle acceleration sensor and the front-end acceleration sensor, wherein the collision determining means outputs a collision output signal;
    a first safety determining means for making a safety determination by using the first output signal of the first in-vehicle acceleration sensor, wherein the first safety determining means outputs a first safety output signal;

a second safety determining means for making a safety determination by using at least one of the output signals of the second in-vehicle acceleration sensor and the front-end acceleration sensor, wherein the second safety determining means outputs a second safety output signal;

a signal processing means including said collision determining means and said second safety determining means, wherein the signal processing means outputs a processed output signal; and an actuating means for actuating an activating means of the occupant protection apparatus by an AND operator of the first safety output signal of said first safety determining means and the processed output signal of said signal processing means, wherein the actuating means outputs a AND operator output signal.

2. An occupant protection activation device according to claim 1, wherein the second in-vehicle acceleration sensor includes a mechanical acceleration sensor.

3. An occupant protection activation device according to claim 1, wherein the actuating means includes:

an AND logic function for obtaining the AND operator of the first safety output signal of the first safety determining means and the processed output signal of the signal processing means;

an integrated circuit into which a high-side transistor switch and a low-side transistor switch are integrated, which turn on and off a drive current to be inputted to the activating means, according to the AND operator output signal of the AND logic function; and a semiconductor switch for turning on and off a power current flowing from a power circuit to said integrated circuit.

4. An occupant protection activation device according to claim 3, wherein the actuating means includes the AND logic function for receiving the first safety output signal of the first safety determining means and the collision output signal of the collision determining means provided within the signal processing means, and actuates the semiconductor switch based on the second safety output signal of the second safety determining means provided within the signal processing means.

5. An occupant protection activation device according to claim 3, wherein the actuating means includes the AND logic function receiving the first safety output signal of the first safety determining means and the collision output signal of the collision determining means provided within the signal processing means, and the actuating means actuates the semiconductor switch by the AND operator of the second safety output signal of the second safety determining means provided within the signal processing means and the collision output signal of the collision determining means.

6. An occupant protection activation device according to claim 3, wherein the actuating means includes the AND logic function for receiving the second safety output signal of the second safety determining means provided within the signal processing means and the collision output signal of the collision determining means, and actuates the semiconductor switch by the first safety output signal of the first safety determining means.

7. An occupant protection activation device comprising:

a first in-vehicle acceleration sensor, disposed within a vehicle interior, for electronically detecting acceleration and outputting a first output signal;

a second in-vehicle acceleration sensor, disposed within said vehicle interior, for electronically detecting acceleration and outputting a second output signal;

third and fourth front-end acceleration sensors, disposed on the left and the right of the vehicle's front-end, respectively, for electronically detecting acceleration and outputting third and fourth output signals, respectively;

a collision determining means for making a collision determination by using at least one of the output signals of said first in-vehicle acceleration sensor, said third, and said fourth front-end acceleration sensors, wherein the collision determining means outputs a collision output signal;

a first safety determining means for making a safety determination by using the output signal of said first in-vehicle acceleration sensor, wherein the first safety determining means outputs a first safety output signal;

a second safety determining means for making a safety determination by using at least one of the output signals of said second in-vehicle acceleration sensor, said third, and said fourth front-end acceleration sensors, wherein the second safety determining means outputs a second safety output signal;

a signal processing means including said collision determining means and said second safety determining means, wherein the signal processing means outputs a processed output signal; and an actuating means for actuating an activating means of the occupant protection apparatus by an AND operator of the first safety output signal of said first safety determining means and the processed output signal of said signal processing means, wherein the actuating means outputs a AND operator output signal.

8. An occupant protection activation device according to claim 7, wherein the second in-vehicle acceleration sensor includes a mechanical acceleration sensor.

9. An occupant protection activation device according to claim 7, wherein the actuating means includes:

an AND logic function for obtaining the AND operator of the first safety output signal of the first safety determining means and the processed output signal of said signal processing means;

an integrated circuit into which a high-side transistor switch and a low-side transistor switch are integrated, which turn on and off a drive current to be outputted to the activating means according to the AND operator output signal of the AND logic function; and a semiconductor switch for turning on and off a power current flowing from a power circuit to the integrated circuit.

10. An occupant protection activation device according to claim 9, wherein the actuating means includes the AND logic function for receiving the first safety output signal of the first safety determining means and the collision output signal of the collision determining means provided within the signal processing means, and actuates the semiconductor switch based on the second safety output signal of the second safety determining means provided within the signal processing means.

11. An occupant protection activation device according to claim 9, wherein the actuating means includes the AND logic function receiving the first safety output signal of the first safety determining means and the collision output signal of the collision determining means provided within the signal processing means, and the actuating means actuates the semiconductor switch by the AND operator of the second safety output signal of the second safety determining means provided within the signal processing means and the collision output signal of the collision determining means.

12. An occupant protection activation device according to claim 9, wherein the actuating means includes the AND logic function receiving the second safety output signal of the second safety determining means provided within the signal processing means and the output collision signal of the collision determining means, and actuates the semiconductor switch by the first safety output signal of the first safety determining means.

* * * * *